US012777429B2

(12) United States Patent
Sun et al.

(10) Patent No.: US 12,777,429 B2
(45) Date of Patent: Oct. 27, 2026

(54) METHODS AND APPARATUSES FOR SELECTING A TRANSMISSION FOR A RESOURCE CONFLICT INDICATION

(71) Applicant: LENOVO (BEIJING) LIMITED, Beijing (CN)

(72) Inventors: Zhennian Sun, Beijing (CN); Xiaodong Yu, Beijing (CN); Haipeng Lei, Beijing (CN); Xin Guo, Beijing (CN)

(73) Assignee: LENOVO (BEIJING) LIMITED, Beijing (CN)

( * ) Notice: Subject to any disclaimer, the term of this patent is extended or adjusted under 35 U.S.C. 154(b) by 424 days.

(21) Appl. No.: 18/552,327

(22) PCT Filed: Mar. 25, 2021

(86) PCT No.: PCT/CN2021/082985
§ 371 (c)(1),
(2) Date: Sep. 25, 2023

(87) PCT Pub. No.: WO2022/198562
PCT Pub. Date: Sep. 29, 2022

(65) Prior Publication Data

US 2024/0163810 A1 May 16, 2024

(51) Int. Cl.
*H04W 52/34* (2009.01)
*H04L 1/1829* (2023.01)
(Continued)

(52) U.S. Cl.
CPC ......... *H04W 52/346* (2013.01); *H04L 1/1854* (2013.01); *H04W 52/281* (2013.01); *H04W 52/367* (2013.01)

(58) Field of Classification Search
CPC ............. H04W 52/346; H04W 52/281; H04W 52/367; H04W 52/383; H04W 72/56; H04W 72/02; H04L 1/1854; H04L 5/003
(Continued)

(56) References Cited

U.S. PATENT DOCUMENTS 10,536,966 B2 * 1/2020 Liu ........................ H04L 5/0055
11,343,844 B2 * 5/2022 Babaei ................ H04W 52/365
(Continued)

FOREIGN PATENT DOCUMENTS

CN 111526587 A 8/2020
CN 111866800 A 10/2020
(Continued)

OTHER PUBLICATIONS

Lenovo, "Sidelink resource allocation for Reliability enhancement", 3GPP TSG RAN WG1 #102-e, R1-2005840, E-meeting, Aug. 17-Aug. 28, 2020. (Year: 2020).*
(Continued)

*Primary Examiner* — Juan A Torres
(74) *Attorney, Agent, or Firm* — AMPACC Law Group, PLLC

(57) ABSTRACT

Embodiments include methods and apparatuses for selecting a transmission for a resource conflict indication in a sidelink wireless communication system in 3GPP (3rd Generation Partnership Project) 5G networks. According to an embodiment of the present disclosure, a method performed by a user equipment (UE) includes: determining a set of candidate transmissions to be transmitted on a transmission occasion in a time domain, each transmission within the set of candidate transmissions is used for a resource conflict indication; determining another set of candidate transmissions to be transmitted on the transmission occasion, each transmission within the abovementioned another set of candidate
(Continued)

transmissions is used for HARQ feedback information; selecting a subset of transmissions from at least one of the set of candidate transmissions and the abovementioned another set of candidate transmissions; and transmitting the subset of transmissions on the transmission occasion.

20 Claims, 4 Drawing Sheets

(51) Int. Cl.
*H04W 52/28* (2009.01)
*H04W 52/36* (2009.01)

(58) Field of Classification Search
USPC .......................................... 455/522, 517, 69
See application file for complete search history.

(56) References Cited

U.S. PATENT DOCUMENTS

| | | | | |
|---|---|---|---|---|
| 11,917,649 | B2 * | 2/2024 | Lee | H04L 1/1893 |
| 12,225,548 | B2 * | 2/2025 | Nazar | H04L 1/1858 |
| 2020/0045724 | A1 | 2/2020 | Lu et al. | |
| 2020/0196255 | A1 | 6/2020 | Cheng | |
| 2021/0022170 | A1 | 1/2021 | Lu | |
| 2021/0058905 | A1 | 2/2021 | Ganesan | |
| 2021/0105728 | A1 * | 4/2021 | Nguyen | H04L 1/1854 |
| 2023/0361933 | A1 * | 11/2023 | Huang | H04L 1/1893 |
| 2023/0362917 | A1 * | 11/2023 | Zhang | H04W 72/563 |

FOREIGN PATENT DOCUMENTS

| | | | |
|---|---|---|---|
| CN | 112187424 | A | 1/2021 |
| EP | 3672337 | A2 | 6/2020 |
| EP | 4271083 | A1 | 11/2023 |
| WO | 2020107349 | A1 | 6/2020 |

OTHER PUBLICATIONS

ITRI, "Discussion on enhancement for NR V2X Mode 2" R1-2007878, 3GPP TSG RAN WG1 #103-e; Oct. 26-Nov. 13, 2020; pp. 1-5.

Lenovo et al. "Sidelink resource allocation for Reliability enhancement" R1-2100767, 3GPP TSG RAN WG1 #104-e; Jan. 25-Feb. 5, 2021; pp. 1-6.

International Search Report and Written Opinion dated Dec. 29, 2021 for International Application No. PCT /CN2021/082985.

VIVO "Discussion on mode 2 enhancements" 3GPP TSG RAN WG1 #103-e R1-2007689; Nov. 13, 2020; 7 Pages.

Moderator (LG Electronics) "Feature lead summary for AI 8.11.1.2 Feasibility and benefits for mode 2 enhancements" #3GPP TSG RAN WG1 #104-e R1-2102167; Feb. 5, 2021; 68 pages.

European Search Report and Written Opinion dated Nov. 14, 2024 for European Patent Application No. 21932189.0.

* cited by examiner

METHODS AND APPARATUSES FOR SELECTING A TRANSMISSION FOR A RESOURCE CONFLICT INDICATION

CROSS REFERENCE TO RELATED APPLICATIONS

This application is a national phase entry of International Application No. PCT/CN2021/082985 filed Mar. 25, 2021, which is incorporated by reference in its entirety.

TECHNICAL FIELD

Embodiments of the present application are related to wireless communication technology, and more particularly, related to methods and apparatuses for selecting a transmission for a resource conflict indication in a sidelink wireless communication system in 3GPP (3rd Generation Partnership Project) 5G networks.

BACKGROUND

A sidelink is a long-term evolution (LTE) feature introduced in 3GPP Release 12, and enables a direct communication between proximal UEs, and data does not need to go through a base station (BS) or a core network. A sidelink communication system has been introduced into 3GPP 5G wireless communication technology, in which a direct link between two user equipments (UEs) is called a sidelink.

3GPP 5G networks are expected to increase network throughput, coverage, and robustness and reduce latency and power consumption. With the development of 3GPP 5G networks, various aspects need to be studied and developed to perfect the 5G technology. Currently, details regarding a transmission selection operation for a resource conflict indication in a sidelink wireless communication system have not been discussed in 3GPP 5G technology yet.

SUMMARY

Some embodiments of the present application provide a method, which may be performed by a user equipment (UE). The method includes: determining a set of candidate transmissions to be transmitted on a transmission occasion in a time domain, each transmission within the set of candidate transmissions is used for a resource conflict indication; determining another set of candidate transmissions to be transmitted on the transmission occasion, each transmission within the abovementioned another set of candidate transmissions is used for HARQ feedback information; selecting a subset of transmissions from at least one of the set of candidate transmissions and the abovementioned another set of candidate transmissions; and transmitting the subset of transmissions on the transmission occasion.

Some embodiments of the present application provide an apparatus. The apparatus includes: a non-transitory computer-readable medium having stored thereon computer-executable instructions, a receiving circuitry; a transmitting circuitry; and a processor coupled to the non-transitory computer-readable medium, the receiving circuitry and the transmitting circuitry, wherein the computer-executable instructions cause the processor to implement the abovementioned method performed by a UE.

The details of one or more examples are set forth in the accompanying drawings and the description below. Other features, objects, and advantages will be apparent from the description and drawings, and from the claims.

BRIEF DESCRIPTION OF THE DRAWINGS

In order to describe the manner in which advantages and features of the present application can be obtained, a description of the present application is rendered by reference to specific embodiments thereof which are illustrated in the appended drawings. These drawings depict only exemplary embodiments of the present application and are not therefore intended to limit the scope of the present application.

DETAILED DESCRIPTION

The detailed description of the appended drawings is intended as a description of preferred embodiments of the present application and is not intended to represent the only form in which the present application may be practiced. It should be understood that the same or equivalent functions may be accomplished by different embodiments that are intended to be encompassed within the spirit and scope of the present application.

Reference will now be made in detail to some embodiments of the present application, examples of which are illustrated in the accompanying drawings. To facilitate understanding, embodiments are provided under specific network architecture and new service scenarios, such as 3GPP 5G, 3GPP LTE Release 8, B5G, 6G, and so on. It is contemplated that along with developments of network architectures and new service scenarios, all embodiments in the present application are also applicable to similar technical problems; and moreover, the terminologies recited in the present application may change, which should not affect the principle of the present application.

In a sidelink communication system, a transmission UE may also be named as a transmitting UE, a Tx UE, a sidelink Tx UE, a sidelink transmission UE, or the like. A reception UE may also be named as a receiving UE, a Rx UE, at sidelink Rx UE, a sidelink reception UE, or the like.

Figure 1:
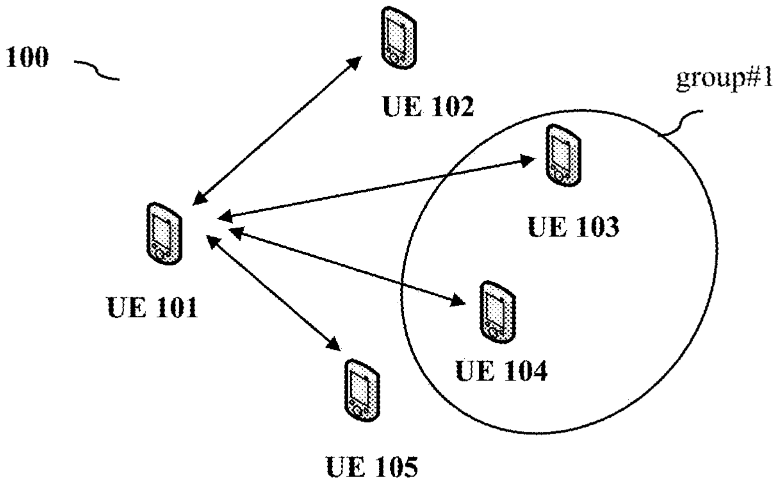
FIG. 1 illustrates an exemplary sidelink wireless communication system in accordance with some embodiments of the present application.

FIG. 1 illustrates an exemplary sidelink wireless communication system in accordance with some embodiments of the present application.

As shown in FIG. 1, a sidelink wireless communication system 100 includes at least five user equipments (UEs), including one Tx UE (i.e., UE 101 as shown in FIG. 11 and four Rx UEs (i.e., UE 102, UE 103, UE 104, and UE 105 as shown in FIG. 1), for illustrative purpose. Although a specific number of UEs are depicted in FIG. 1, it is contemplated that any number of UE(s) (e.g., Tx UE(s) or Rx UE(s)) may be included in the sidelink wireless communication system 100.

The sidelink transmission implemented in the wireless communication system 100 of the embodiments of FIG. 1 includes unicast transmission, groupcast transmission, and broadcast transmission. For example, UE 102 and UE 105 represent Rx UEs for unicast transmission. UE 103 and UE 104 may form group #1 as shown in FIG. 1. In one example, group #1 may correspond to a sidelink groupcast session for groupcast transmission. UE 101 may transmit data to UE 103 and UE 104 in group #1 through a sidelink groupcast session. In a further example, group #1 may correspond to a sidelink broadcast session for broadcast transmission. UE 101 may transmit data to UE 103 and UE 104 in group #1 through a sidelink broadcast session.

Each UE in FIG. 1 may include computing devices, such as desktop computers, laptop computers, personal digital assistants (PDAs), tablet computers, smart televisions (e.g., televisions connected to the Internet), set-top boxes, game consoles, security systems (including security cameras), vehicle on-board computers, network devices (e.g., routers, switches, and modems), or the like. According to some embodiments of the present application, a UE in FIG. 1 may include a portable wireless communication device, a smart phone, a cellular telephone, a flip phone, a device having a subscriber identity module, a personal computer, a selective call receiver, or any other device that is capable of sending and receiving communication signals on a wireless network.

In some embodiments of the present application, a UE in FIG. 1 is a pedestrian UE (P-UE or PUE) or a cyclist UE. In some embodiments of the present application, a UE in FIG. 1 includes wearable devices, such as smart watches, fitness bands, optical head-mounted displays, or the like. Mareover, a UE in FIG. 1 may be referred to as a subscriber unit, a mobile, a mobile station, a user, a terminal, a mobile terminal, a wireless terminal, a fixed terminal, a subscriber station, a user terminal, or a device, or described using other terminology used in the art. A UE in FIG. 1 may communicate directly with a base station (BS) via LTE or NR Uu interface.

In some embodiments of the present application, each UE in FIG. 1 may be deployed an IoT application, an enhanced mobile broadband (eMBB) application and/or an ultra-reliable and low latency communication (URLLC) application. For instance, UE 101 may implement an IoT application and may be named as an IoT UE, while UE 102 may implement an eMBB application and/or a URLLC application and may be named as an eMBB UE, an URLLC UE, or an eMBB/URLLC UE. It is contemplated that the specific type of application(s) deployed in the UE in FIG. 1 may be varied and not limited.

According to some embodiments of FIG. 1, a UE may exchange sidelink messages with another UE(s) through a sidelink, for example, PC5 interface as defined in 3GPP standard document TS23.303. The UE may transmit information or data to another UE(s) within the sidelink communication system, through sidelink unicast, sidelink groupcast, or sidelink broadcast.

The wireless communication system 100 may be compatible with any type of network that is capable of sending and receiving wireless communication signals. For example, the wireless communication system 100 is compatible with a wireless communication network, a cellular telephone network, a Time Division Multiple Access (TDMA)-based network, a Code Division Multiple Access (CDMA)-based network, an Orthogonal Frequency Division Multiple Access (OFDMA)-based network, a LTE network, a 3GPP-based network, a 3GPP 5G network, a satellite communications network, a high altitude platform network, and/or other communications networks.

In some embodiments of the present application, the wireless communication system 100 is compatible with the 5G NR of the 3GPP protocol, wherein BS(s) (not shown in FIG. 1) transmit data using an OFDM modulation scheme on the downlink (DL) and the UE(s) in FIG. 1 transmit data on the uplink (UL) using a Discrete Fourier Transform-Spread-Orthogonal Frequency Division Multiplexing (DFT-S-OFDM) or cyclic prefix-OFDM (CP-OFDM) scheme. More generally, however, the wireless communication system 100 may implement some other open or proprietary communication protocols, for example, WiMAX, among other protocols.

Currently, two sidelink resource allocation modes are supported, i.e., Mode 1 and Mode 2. In Mode 1, sidelink resource(s) in time and frequency domains allocation is provided by a network or a BS. In Mode 2, a UE decides sidelink transmission, resource(s) in time and frequency domains in a resource pool. According to agreements of 3GPP RAN1 meeting, an inter-UE coordination in Mode 2 is feasible and beneficial (e.g., reliability, etc.) compared to Release 16 Mode 2 resource allocation.

Referring back to FIG. 1, in particular, a UE within UE 102 to UE 105 (which may also function as a Tx UE) may transmit trigger information or coordination information to UE 101 (which may function as a coordination UE). UE 101 may work with sidelink resource allocation Mode 1 or Mode 2. A candidate receiver may also be named as an intended receiver, a targeted receiver, a candidate receiving UE, a candidate Rx UE, or the like. UE 101 may transmit information regarding a set of resources in time domain and/or frequency domain to the UE within UE 102 to UE 105.

In general, three types of inter-UE coordination schemes have been evaluated and studied in 3GPP RAN1 meeting as follows. (1) Type A: UE-A (e.g., UE 101 illustrated and shown in FIG. 1) sends to UE-B (e.g., any of UE 102 to UE 105 illustrated and shown in FIG. 1) a set of resources preferred for UE-B's transmission, e.g., based on its sensing result. (2) Type B: UE-A sends to UE-B a set of resources not preferred for UE-B's transmission, e.g., based on its sensing result and/or expected/potential resource conflict. (3) Type C: UE-A sends to UE-B a set of resources where the resource conflict is detected. For Type C inter-UE coordination (UE-A sends to UE-B the set of resources where the resource conflict is detected), physical sidelink feedback channel (PSFCH) resources is proposed to be used to transmit the collision indicator.

Currently, details regarding how to handle multiple PSFCH transmission when a resource collision indicator is transmitted on PSFCH resources or in the same slot with PSFCHs have not been discussed in 3GPP 5G technology yet. Embodiments of the present application define specific alternatives to address the above issues on some schemes on simultaneous PSFCH transmission or reception considering two kinds of PSFCH transmissions, e.g., one is for HARQ feedback and the other one is for collision indication.

Some embodiments of the present application define a transmission selection operation for a resource conflict indication. A resource conflict indicator may be marked as "RCI" or the like. For example, a UE needs to transmit two set of transmissions, while one set of transmissions are for resource conflict indication (e.g., for RCIs) and other one set of transmissions are for HARQ feedback. The UE may select a subset of transmissions from these two sets under a restriction of the UE's capability and the UE's power as follows. Then, the UE actually transmits the selected subset of transmissions. More details will be illustrated in the following text in combination with the appended drawings.

Figure 2:
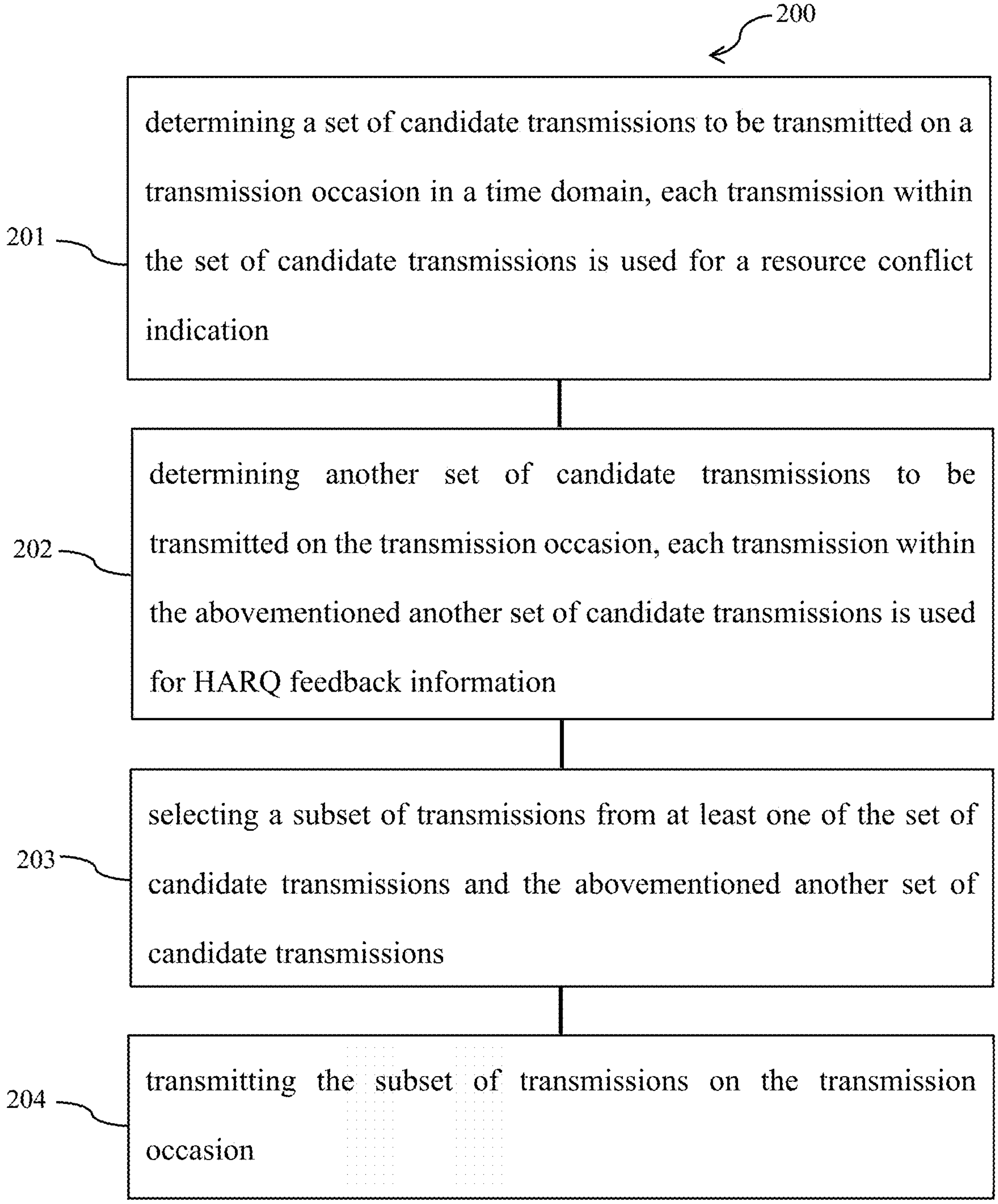
FIG. 2 illustrates an exemplary flow chart of a method for selecting a subset of transmissions from two set of candidate transmissions according to some embodiments of the present application.

FIG. 2 illustrates an exemplary flowchart of a method for selecting subset of transmissions from two set of candidate transmissions according to some embodiments of the present application. The embodiments of FIG. 2 may be performed by a UE (e.g., any of UE 101, UE 102, UE 103, UE 104, and UE 105 illustrated and shown in FIG. 1). In some cases, the UE may function as coordination UE. Although described with respect to a UE, it should be understood that other devices may be configured to perform a method similar to that of FIG. 2.

In the exemplary method 200 as shown in FIG. 2, in operation 201, a UE (e.g., UE 101 illustrated and shown in FIG. 1) determines a set of candidate transmissions to be transmitted on a transmission occasion in a time domain, and each transmission within this set is used for a resource conflict indication, e.g., for a RCI. The set of candidate transmissions determined in operation 201 may also be named as "the set of candidate transmissions for RCIs" or the like.

According to some embodiments, each transmission within the set of candidate transmissions for RCIs is associated with control signal(s), and each control signal within the control signal(s) includes a priority field value. In an embodiment, the UE determines a smallest priority field value included in the control signal(s) associated with each transmission, and uses the smallest priority field value as a priority of each transmission. In an embodiment, each transmission is associated with sidelink control information (SCI) and the SCI is associated with a reserved resource conflict. For example, if a transmission is associated with two SCI values and each SCI value includes a priority field value, the UE may determine a smaller priority field value within two priority field values and use the smaller priority field value as a priority of the transmission. If a transmission is associated with three SCI values and each SCI value includes a priority field value, the UE may determine the smallest priority field value within three priority field values and use the smallest priority field value as a priority of the transmission.

In operation 202, the UE determines another set of candidate transmissions to be transmitted on the transmission occasion, and each transmission within this set is used for HARQ feedback information. The abovementioned another set of candidate transmissions determined in operation 202 may also be named as "the set of candidate transmissions for HARQ feedbacks" or the like.

According to some embodiments, each transmission within the set of candidate transmissions for HARQ feedbacks is associated with one control signal which includes a priority field value. In an embodiment, the UE uses the priority field value included in this control signal as a priority of each transmission. In an embodiment, a transmission is associated with SCI that is associated with a reserved resource conflict, and the UE uses a priority field value included in this SCI as a priority of the transmission.

In operation 203, the UE selects a subset of transmissions from at least one of the set of candidate transmissions and the set of candidate transmissions for HARQ feedbacks. In operation 204, the UE actually transmits the subset of transmissions on the transmission occasion. For instance, the transmission occasion is a PSFCH transmission occasion. That is, the UE transmits the selected subset of transmissions on a PSFCH transmission occasion. In some embodiments, the UE drops candidate transmissions which are not actually transmitted on transmission occasion. In some embodiments, each transmission within the subset of transmissions has the same transmitting power.

According to some embodiments, the UE determines whether a power control parameter (e.g., $P_{o,PSFCH}$) is configured to the UE. According to whether the power control parameter (e.g., $P_{o,PSFCH}$) is configured or not, the UE may perform different operations in different embodiments as below.

In some embodiments, if the power control parameter. (e.g., $P_{o,PSFCH}$) is configured to the UE, the UE computes a total number of all transmissions (e.g., $N_{sch,Tx}$) within two sets of candidate transmissions (i.e., the set of candidate transmissions for RCIs and the set of candidate transmissions for HARQ feedbacks determined in operation 202 for HARQ feedbacks). Then, the UE determines whether the computed total number is less than or equal to a maximum total number (e.g., $N_{max}$). For example, the maximum total number may be associated with the UE's capability.

In a case (e.g., which is marked as Case A) that the computed total number is less than or equal to the maximum total number (e.g., $N_{sch,Tx} \leq N_{max}$), the UE may determine whether a power sum (e.g., P) of all transmissions within two sets of candidate transmissions is less than or equal to a maximum power (e.g., $P_{CMAX}$) of the UE.

(1) If the power sum is less than or equal to the maximum power (e.g., $P \leq P_{CMAX}$), the UE transmits all transmissions within two sets of candidate transmissions on the transmission occasion.

(2) If the power sum is greater than the maximum power (e.g., $P > P_{CMAX}$), the UE orders priorities of all transmissions within two sets of candidate transmissions, to form a set of prioritized transmissions. The UE may select the subset of transmissions from the set of prioritized transmissions according to an ascending priority order, such that: a power sum of the selected subset of transmissions is less than or equal to the maximum power, and a total number of transmissions (e.g., $N_{Tx}$) within the selected subset of transmissions is greater than or equal to a minimum threshold. For example, the minimum threshold is marked as a lower bound X, which is >=1.

In some embodiments of Case A, during selecting the subset of transmissions from the set of prioritized transmissions according to an ascending priority order, the UE further performs the following operations (specific examples are described in FIG. 3 and Embodiment 1):

(1) the UE computes a total number of transmissions associated with each priority in the set of prioritized transmissions with the ascending priority order;

(2) the UE computes a power sum of the transmissions associated with each priority in the set of prioritized transmissions with the ascending priority order; and (3) the UE selects all transmissions associated with one or more priorities from the set of prioritized transmissions, such that the one or more priorities are most priorities within priorities of all transmissions within the set of prioritized transmissions when a power sum of all transmissions associated with the one or more priorities is less than or equal to the maximum power (e.g., $P_{CMAX}$).

In some further embodiments of Case A, during selecting the subset of transmissions from the set of prioritized transmissions, the UE performs the following operations (specific examples are described in FIG. 4 and Embodiment 2):

(1) the UE determines whether a power sum of all transmissions within the set of candidate transmissions for RCIs is greater than the maximum power (e.g., $P_{CMAX}$);

(2) if the power sum is greater than the maximum power, the UE selects all transmissions associated with one or more priorities from the set of candidate transmissions for RCIs, such that the one or more priorities are most priorities within priorities of all transmissions within the set of candidate transmissions for RCIs when a power sum of all transmissions associated with the one or more priorities is less than or equal to the maximum power; and (3) if the power sum is less than or equal to the maximum power, the UE selects all transmissions within the set of candidate transmissions for RCIs and selects transmission(s) within the set of candidate transmissions for HARQ feedbacks, such that a power sum of all selected transmissions is less than or equal to the maximum power.

In some other embodiments of Case A, during selecting the subset of transmissions from the set of prioritized transmissions, the UE performs the following operations (specific examples are described in FIG. 5 and Embodiment 3):

(1) the UE determines whether a power sum of all transmissions associated with two or more reserved resources in a time domain within the set of candidate transmissions for RCIs is greater than the maximum power (e.g., $P_{CMAX}$);

(2) if the power sum is greater than the maximum power, the UE selects all transmissions associated with one or more priorities from all transmissions associated with two or more reserved resources in the time domain within the set of candidate transmissions for RCIs, such that the one or more priorities are most priorities within priorities of all transmissions associated with two or more reserved resources in the time domain within the set of candidate transmissions for RCIs when a power sum of all transmissions associated with the one or more priorities is less than or equal to the maximum power; and (3) if the power sum is less than or equal to the maximum power, the UE selects all transmissions associated with two or more reserved resources in the time domain within the set of candidate transmissions for RCIs and further selects transmission(s) from all transmissions associated with one reserved resource in the time domain within the set of candidate transmissions for RCIs and all transmissions within the set of candidate transmissions for HARQ feedbacks, such that a power sum of all selected transmissions is less than or equal to the maximum power.

In some additional embodiments of Case A, during selecting the subset of transmissions from the set of prioritized transmissions, the UE performs the following operations (specific examples are described in FIG. 6 and Embodiment 4):

(1) the UE determines whether a power sum (e.g., P1) of all transmissions associated with two or more reserved resources in a time domain within the set of candidate transmissions for RCIs is greater than the maximum power (e.g., $P_{CMAX}$);

(2) if the power sum (e.g., P1) is greater than the maximum power, the UE selects all transmissions associated with one or more priorities from all transmissions associated with two or more reserved resources in the time domain within the set of candidate transmissions for RCIs, such that the one or more priorities are most priorities within priorities of all transmissions associated with two or more reserved resources in the time domain within the set of candidate transmissions for RCIs when a power sum of all transmissions associated with the one or more priorities is less than or equal to the maximum power; and (3) if the power sum (e.g., P1) is less than the maximum power, the UE determines whether a power sum (e.g., P2) of all transmissions associated with two or more reserved resources and all transmissions associated with one reserved resource in the time domain within the set of candidate transmissions for RCIs is greater than the maximum power:

a) if this power sum (e.g., P2) is greater than the maximum power, the UE selects all transmissions associated with two or more reserved resources in the time domain within the set of candidate transmissions for RCIs and selecting transmission(s) from all transmissions associated with one reserved resource in the time domain within the set of candidate transmissions for RCIs and all transmissions within the second set of candidate transmissions, such that a power sum of all selected transmissions is less than or equal to the maximum power; and b) if this power sum (e.g., P2) is less than or equal to the maximum power, the UE selects all transmissions associated with two or more reserved resources and all transmissions associated with one reserved resource in the time domain within the set of candidate transmissions for RCIs and selecting transmission(s) from all transmissions within the second set of candidate transmissions, such that a power sum of all selected transmissions is less than or equal to the maximum power.

In a further case (e.g., which is marked as Case B) that the total number of all transmissions within two sets of candidate transmissions is greater than the maximum total number (e.g., $N_{sch,Tx}>N_{max}$), the UE may order priorities of all transmissions within two sets of candidate transmissions, to form a set of prioritized transmissions. Then, the UE may select the subset of transmissions from the set of prioritized transmissions according to an ascending priority order, and transmit the selected subset of transmissions on the transmission occasion.

In some embodiments of Case B, during selecting the subset of transmissions from the set of prioritized transmissions, the UE performs the following operations:

(1) the UE selects the maximum total number (e.g., $N_{max}$) of transmissions from the set of prioritized transmissions;

(2) the UE determines whether a power sum (e.g., $P_s$) of the selected maximum total number (e.g., $N_{max}$) of transmissions is less than or equal to a maximum power (e.g., $P_{CMAX}$) of the UE;

(3) if the power sum (e.g., $P_s$) is less than or equal to the maximum power, the UE transmits the selected maximum total number (e.g., $N_{max}$) of transmissions; and (4) if the power sum (e.g., $P_s$) is greater than the maximum power, the UE selects transmission(s) within the selected minimum number of transmissions according to the ascending priority order, such that a power sum of the selected transmission(s) is less than or equal to the maximum power. Then, the UE transmits the selected transmission(s) on the transmission occasion.

In some embodiments of Case B, the UE jointly orders priorities of all transmissions within two sets of candidate transmissions, to form the set of prioritized transmissions; and then select simultaneous transmissions from the set of prioritized transmissions according to the ascending priority order. Specific examples are described in FIG. 3 and Embodiment 1.

In some other embodiments of Case B, the UE orders priorities of transmissions within the set of candidate transmissions for RCIs, to form one set of prioritized transmissions (e.g., $1^{st}$ set of prioritized transmissions), and orders priorities of transmissions within the set of candidate transmissions for HARQ feedbacks, to form a further set of prioritized transmissions (e.g., $2^{nd}$ set of prioritized transmissions). These two sets of prioritized transmissions constitute the set of prioritized transmissions. That is, the set of prioritized transmissions includes $1^{st}$ set of prioritized transmissions and $2^{nd}$ set of prioritized transmissions. Then, the UE may select the subset of transmissions from the set of prioritized transmissions and transmit the selected subset of transmissions on the transmission occasion.

In particular, in an embodiment within these other embodiments of Case B, during selecting the maximum total number (e.g., $N_{max}$) of transmissions from the set of prioritized transmissions according to the ascending priority order (specific examples are described in FIG. 4 and Embodiment 2):

(1) if a total number of all transmissions within $1^{st}$ set of prioritized transmissions is greater than or equal to the maximum total number (e.g., $N_{max}$), the UE selects the maximum total number of transmissions within $1^{st}$ set of prioritized transmissions according to the ascending priority order; and (2) if a total number of all transmissions within $1^{st}$ set of prioritized transmissions is less than the maximum total number (e.g., $N_{max}$), the further selects transmission(s) within $2^{nd}$ set of prioritized transmissions according to the ascending priority order, such that a total number of all transmissions within $1^{st}$ set of prioritized transmissions and the transmission(s) within $2^{nd}$ set of prioritized transmissions is equal to the maximum total number (e.g., $N_{max}$).

Figure 5:
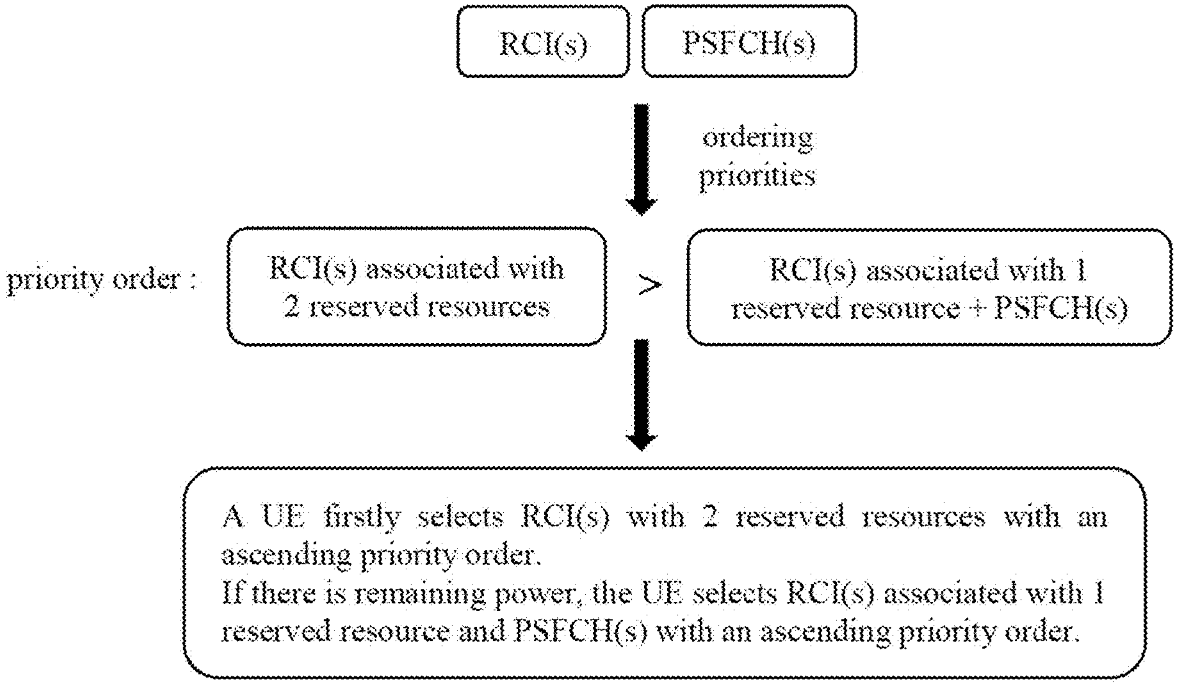
FIG. 5 illustrates an exemplary diagram for ranking priorities of different types of transmissions according to some embodiments of the present application.
Figure 6:
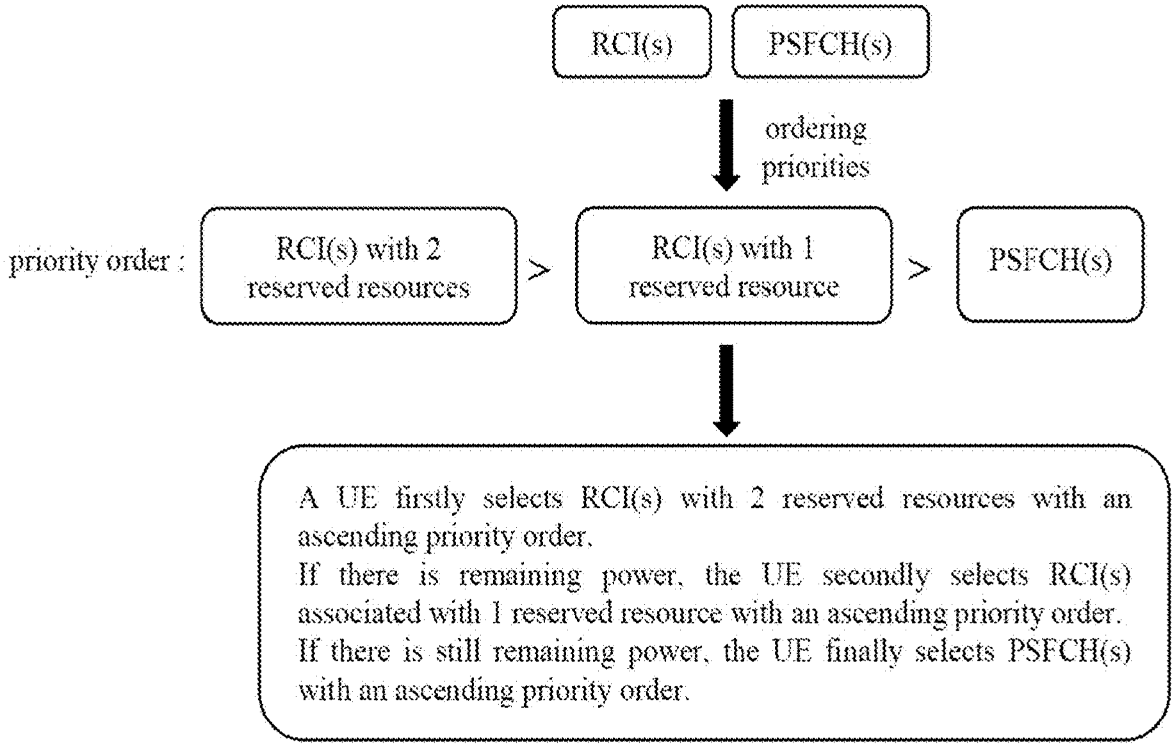
FIG. 6 illustrates a further exemplary diagram for ranking priorities of different types of transmissions according to some embodiments of the present application.

In a further embodiment within these other embodiments of Case B, during selecting the maximum total number (e.g., $N_{max}$) of transmissions from the set of prioritized transmissions according to the ascending priority order, the UE further performs the following operations (specific examples are described in FIGS. 5 and 6 and Embodiments 3 and 4):

(1) if a total number of all transmissions associated with two or more reserved resources in a time domain within $1^{st}$ set of prioritized transmissions is greater than or equal to the maximum total number (e.g., $N_{max}$), the UE selects the maximum total number of transmissions associated with two or more reserved resources in the time domain within $1^{st}$ set of prioritized transmissions according to the ascending priority order; and (2) in response to the total number of all transmissions associated with two or more reserved resources in the time domain within $1^{st}$ set of prioritized transmissions is less than the maximum total number (e.g., $N_{max}$), the UE may adopt following Option 1 or Option 2:

a) Option 1: the UE jointly selects transmission(s) associated with one reserved resource in the time domain within $1^{st}$ set of prioritized transmissions and transmission(s) within $2^{nd}$ set of prioritized transmissions according to the ascending priority order such that a total number of all selected transmissions is equal to the maximum total number (specific examples are described in FIG. 5 and Embodiment 3).

b) Option 2: the UE firstly selects transmission(s) associated with one reserved resource in the time domain within $1^{st}$ set of prioritized transmissions according to the ascending priority order, and secondly selects transmission(s) within $2^{nd}$ set of prioritized transmissions according to the ascending priority order, such that a total number of all selected transmissions is equal to the maximum total number (e.g., $N_{max}$) (specific examples are described in FIG. 6 and Embodiment 4).

In some embodiments of Case B, during selecting transmission(s) within the selected minimum number of transmissions, the UE further performs the following operations (specific examples are described in FIG. 3 and Embodiment 1):

(1) the UE computes a total number of transmissions associated with each priority in the selected minimum number of transmissions with the ascending priority order;

(2) the UE computes a power sum of the transmissions associated with each priority in the selected minimum number of transmissions with the ascending priority order; and (3) the UE selects all transmissions associated with one or more priorities from the selected minimum number of transmissions, such that the one or more priorities are most priorities within the priorities of all transmissions within the selected minimum number of transmissions when a power sum of all transmissions associated with the one or more priorities is less than or equal to the maximum power (e.g., $P_{CMAX}$).

In some other embodiments of Case B, during selecting transmission(s) within the selected minimum number of transmissions, the UE further performs the following operations (specific examples are described in FIG. 4 and Embodiment 2):

(1) the UE determines whether a power sum of all transmissions belonging to the first set of candidate transmissions within the selected minimum number of transmissions is greater than th maximum power (e.g., $P_{CMAX}$);

(2) if the power sum of all transmissions belonging to the set of candidate transmissions for RCIs within the selected minimum number of transmissions is greater than the maximum power (i.e., $>P_{CMAX}$), the UE selects all transmissions associated with one or more priorities from all transmissions belonging to the set of candidate transmissions for RCIs within the selected minimum number of transmissions, such that the one or more priorities are most priorities within priorities of all transmissions belonging to the set of candidate transmissions for RCIs within the selected minimum number of transmissions when a power sum of all transmissions associated with the one or more priorities is less than or equal to the maximum power;

(3) if the power sum of all transmissions belonging to the set of candidate transmissions for RCIs within the selected minimum number of transmissions is less than or equal to the maximum power (i.e., $\leq P_{CMAX}$), the UE selects all transmissions belonging to the set of candidate transmissions for RCIs (which is determined in operation 201) within the selected minimum number of transmissions and selects one or more transmissions belonging to the set of candidate transmissions for HARQ feedbacks (which is determined in operation 202) within the selected minimum number of transmissions, such that a power sum of all selected transmissions is less than or equal to the maximum power.

In some further embodiments of Case B, during selecting transmission(s) within the selected minimum number of transmissions, the UE further performs the following operations (specific examples are described in FIG. 5 and Embodiment 3):

(1) the UE determines whether a power sum of all transmissions associated with two or more reserved resources in a time domain within the selected minimum number of transmissions is greater than the maximum power (e.g., $P_{CMAX}$);

(2) if the power sum of all transmissions associated with two or more reserved resources in the time domain within the selected minimum number of transmissions is greater than the maximum power (i.e., $>P_{CMAX}$), the UE selects all transmissions associated with one or more priorities from all transmissions associated with two or more reserved resources in the time domain within the selected minimum number of transmissions, such that the one or more priorities are most priorities within priorities of all transmissions associated with two or more reserved resources in the time domain within the selected minimum number of transmissions when a power sum of all transmissions associated with the one or more priorities is less than or equal to the maximum power; and (3) if the power sum of all transmissions associated with two or more reserved resources in the time domain within the selected minimum number of transmissions is less than or equal to the maximum power (i.e., $\leq P_{CMAX}$), the UE selects all transmissions associated with two or more reserved resources in the time domain within the selected minimum number of transmissions, and selects one or more transmissions from: all transmissions associated with one reserved resource in the time domain; and all transmissions used for HARQ feedback information within the selected minimum number of transmissions, such that a power sum of all selected trans missions is less than or equal to the maximum power.

In some additional embodiments of Case B, during selecting transmission(s) within the selected minimum number of transmissions, the UE further performs the following operations (specific examples are described in FIG. 6 and Embodiment 4):

(1) the UE determines whether a power sum of all transmissions associated with two or more reserved resources in a time domain within the selected minimum number of transmissions is greater than the maximum power (e.g., $P_{CMAX}$);

(2) if the power sum of all transmissions associated with two or more reserved resources in the time domain within the selected minimum number of transmissions is greater than the maximum power (i.e., $>P_{CMAX}$), selecting all transmissions associated with one or more priorities from all transmissions associated with two or more reserved resources in the time domain within the selected minimum number of transmissions, such that the one or more priorities are most priorities within priorities of all transmissions associated with two or more reserved resources in the time domain within the selected minimum number of transmissions when a power sum of all transmissions associated with the one or more priorities is less than or equal to the maximum power;

(3) if the power sum of all transmissions associated with two or more reserved resources in the time domain within the selected minimum number of transmissions is less than the maximum power (i.e., $<P_{CMAX}$), determining whether a power sum of all transmissions associated with two or more reserved resources and all transmissions associated with one reserved resource in the time domain within the selected minimum number of transmissions is greater than the maximum power;

(4) if the power sum of all transmissions associated with two or more reserved resources and all transmissions associated with one reserved resource in the time domain within the selected minimum number of transmissions is greater than the maximum power (i.e., $>P_{CMAX}$), selecting all transmissions associated with two or more reserved resources in the time domain within the selected minimum number of transmissions, and selecting one or more transmissions from: all transmissions associated with one reserved resource in the time domain within the selected minimum number of transmissions; and all transmissions used for HARQ feedback information within the selected minimum number of transmissions, such that a power sum of all selected transmissions is less than or equal to the maximum power; and (5) if the power sum of all transmissions associated with two or more reserved resources and all transmissions associated with one reserved resource in the time domain within the selected minimum number of transmissions is less than or equal to the maximum power (i.e., $\leq P_{CMAX}$), the UE selects all transmissions associated with two or more reserved resources and all transmissions associated with one reserved resource in the time domain within the selected minimum number of transmissions, and selects transmission(s) used for HARQ feedback information within the selected minimum number of transmissions, such that a power sum of all selected transmissions is less than or equal to the maximum power.

In some embodiments, if the power control parameter (e.g., $P_{o,PSFCH}$) is not configured to the UE, the UE orders priorities of all transmissions within two sets of candidate transmissions to form a set of prioritized transmissions, and selects the subset of transmissions from the set of prioritized transmissions according to an ascending priority order. A total number of the subset of transmissions is larger than or equal to 1.

In an embodiment, the UE jointly orders priorities of all transmissions within two sets of candidate transmissions to form the set of prioritized transmissions, and selects simultaneous transmissions from the set of prioritized transmissions according to the ascending priority order.

In a further embodiment, the UE orders priorities of transmissions within the set of candidate transmissions for RCIs, to form $1^{st}$ set of prioritized transmissions, and orders priorities of transmissions within the set of candidate transmissions for HARQ feedbacks, to form $2^{nd}$ set of prioritized transmissions. The set of prioritized transmissions includes $1^{st}$ set of prioritized transmissions and $2^{nd}$ set of prioritized transmissions. Then, the UE may select the subset of transmissions from the set of prioritized transmissions and transmit the selected subset of transmissions on the transmission occasion. In particular, during selecting subset of transmissions according to the ascending priority order, the UE may adopt one of Options A-C:

Option A: the UE firstly selects transmission(s) within $1^{st}$ set of prioritized transmissions according to the ascending priority order, and secondly selects transmission(s) within $2^{nd}$ set of prioritized transmissions according to the ascending priority order. Specific examples are described in FIG. 4 and Embodiment 2.

Option B: the UE firstly selects transmission(s) associated with two or more reserved resources in a time domain within $1^{st}$ set of prioritized transmissions according to the ascending priority order, and secondly select transmission(s) associated with one reserved resource in the time domain within $1^{st}$ set of prioritized transmissions and transmission(s) within $2^{nd}$ set of prioritized transmissions according to the ascending priority order. Specific examples are described in FIG. 5 and Embodiment 3.

Option C: the UE firstly selects transmission(s) associated with two or more reserved resources in the time domain within $1^{st}$ set of prioritized transmissions according to the ascending priority order, secondly select transmission(s) associated with one reserved resource in the time domain within $1^{st}$ set of prioritized transmissions according to the ascending priority order, and thirdly select transmission(s) within $2^{nd}$ set of prioritized transmissions according to the ascending priority order. Specific examples are described in FIG. 6 and Embodiment 4.

Details described in the embodiments as illustrated and shown in FIGS. 1 and 3-7, especially, contents related to selecting a RCI transmission are applicable for the embodiments as illustrated and shown in FIG. 2. Moreover, details described in the embodiments of FIG. 2 are applicable for all the embodiments of FIGS. 1 and 3-7.

Some embodiments of the subiect application assume that a UE would like to transmit two sets of transmissions in one transmission occasion (e.g., a PSFCH transmission occasion i). $1^{st}$ set to be transmitted in the transmission occasion is a set of resource conflict indicator transmissions with a size $N_{sch,Tx,RCI}$. $2^{nd}$ set to be transmitted in the transmission occasion is a set of PSFCHs for HARQ feedback with a size $N_{sch,Tx,PSFCH}$. A total number of all transmissions in $1^{st}$ set and $2^{nd}$ set may be marked as: $N_{sch,Tx}=N_{sch,Tx,RCI}+N_{sch,Tx,PSFCH}$. The embodiments of the subject application assume that the UE is capable of transmitting a maximum of $N_{max}$ transmission from $1^{st}$ set and $2^{nd}$ set, and a value of $N_{max}$ is determined by the UE's capability. The UE may determine a number $N_{Tx}$ of simultaneous transmissions and a power $P_k(i)$ for a transmission k, $1 \le k \le N_{Tx}$, on a PSFCH transmission occasion i. More details will be illustrated in the following text in combination with the appended FIGS. 3-6.

Figure 3:
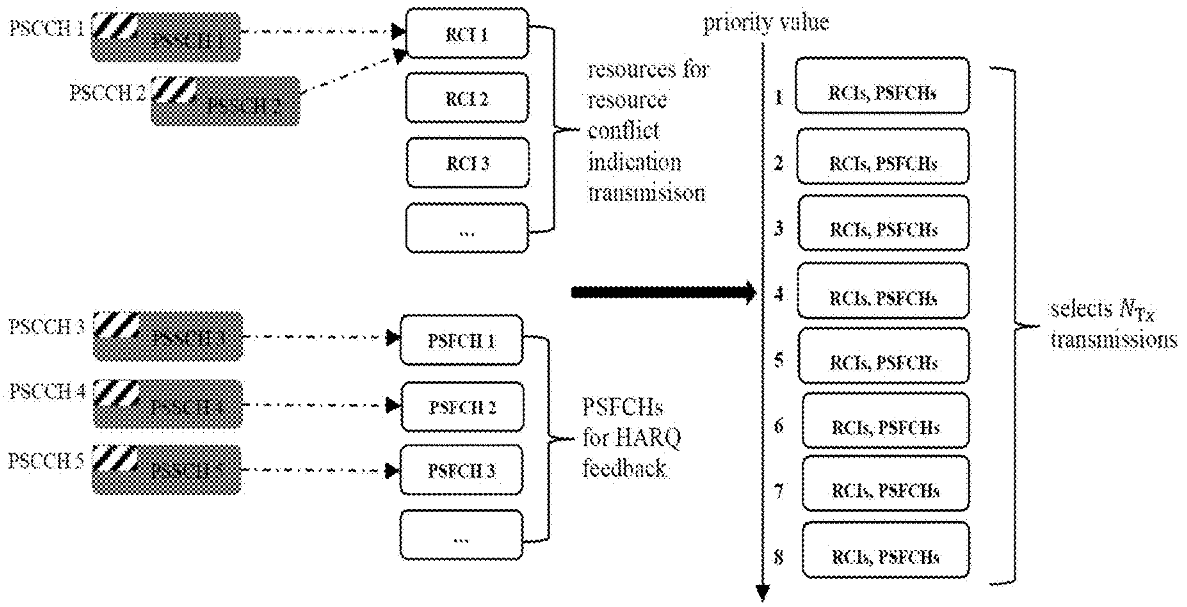
FIG. 3 illustrates an exemplary diagram for jointly ordering priorities of transmissions within two set of candidate transmissions according to some embodiments of the present application.

FIG. 3 illustrates an exemplary diagram for jointly ordering priorities of transmissions within two set of candidate transmissions according to some embodiments of the present application. In the embodiments of FIG. 3, RCI transmissions and PSFCH transmissions are equivalent and their priorities are jointly ordered, and a UE selects RCI transmissions and PSFCH transmissions according to associated priority values. Some embodiments design a new rule for an associated priority value for a RCI transmission.

In particular, in the embodiments of FIG. 3, in $1^{st}$ set to be transmitted in a transmission occasion, a RCI transmission may be associated with multiple received SCI signals, and each SCI has one priority value. Thus, each RCI transmission may be associated with one or more priority values. One priority value within the one or more priority values may be used as a priority value of a RCI transmission. In $2^{nd}$ set to be transmitted in the transmission occasion, a PSFCH transmission for HARQ feedback is only associated with one SCI signal. Thus, each PSFCH transmission for HARQ feedback is only associated with one priority value.

As shown in FIG. 3, $1^{st}$ set to be transmitted includes multiple resources for resource conflict indication transmission (i.e., multiple RCI transmissions) which are marked as RCI 1, RCI 2, RCI 3, and so on. RCI 1 is associated with both PSCCH 1 associated with PSSCH 1 and PSCCH 2 associated with PSSCH 2. For example, PSCCH 1 is a SCI signal including priority value 1 and PSCCH 2 is a SCI signal including priority value 2. In an embodiment, a smaller one within priority value 1 and priority value 2 is used as a priority of RCI 1.

As shown in FIG. 3, $2^{nd}$ set to be transmitted includes multiple PSFCHs for HARQ feedback (i.e., multiple PSFCH transmissions) which are marked as PSFCH 1, PSFCH 2, PSFCH 3 and so on. PSFCH 1 is associated with PSCCH 3 associated with PSSCH 3. PSFCH 2 is associated with PSCCH 4 associated with PSSCH 4. PSFCH 3 is associated with PSCCH 5 associated with PSSCH 5. For example, PSCCH 3 is a SCI signal including priority value 3, PSCCH 4 is a SCI signal including priority value 4, and PSCCH 5 is a SCI signal including priority value 5. Then, priority value 3, priority value 4, and priority value 5 may be used as priorities of PSFCH 1, PSFCH 2, and PSFCH 3, respectively.

According to some embodiments, priorities of all transmissions within $1^{st}$ set and $2^{nd}$ set to be transmitted are jointly ordered to form a set of prioritized transmissions. As shown in FIG. 3, all transmissions are jointly ordered as priority levels 1, 2, 3, 4, 5, 6, 7, and 8, respectively. In other words, some RCI(s) and PSFCH(s) are ordered to correspond to priority level 1 to priority level 8, respectively. Then, a UE may select $N_{Tx}$ of transmissions from the set of prioritized transmissions according to an ascending priority order.

According to some embodiments of FIG. 3, within one priority level (e.g., any of priority levels 1-8), a UE may select RCI(s) and PSFCH(s) by any one of following orders:

(1) priorities of RCIs>priorities of PSFCHs.

(2) priorities of RCIs associated with 2 reserved resources>priorities of RCIs associated with 1 reserved resource>priorities of PSFCHs.

(3) priorities of RCIs associated with 2 reserved resources>priorities of RCIs associated with 1 reserved resource, while priorities of RCIs associated with 1 reserved resource=priorities of PSFCHs.

The following texts describe specific Embodiment 1 of the method as shown and illustrated in FIG. 3. Consents in Embodiment 1 are similar to contents specified in 3GPP standard document TS38.213. According to Embodiment 1, a UE (e.g., UE 101*a* as shown and illustrated in FIG. 1) may select RCI transmission(s) and PSFCH transmission(s) by following steps and equations. $N_{sch,Tx,RCI}$ is a total number of RCI(s) associated with one or more reserved resources.

If $P_{o,PSFCH}$ is provided, $P_{one}=P_{o,PSFCH}+10\log_{10}(2^{\mu})+\alpha_{PSFCH}PL$[dBm]

$N_{sch,Tx}\le N_{max}$

When $P_{one}+10\log_{10}(N_{sch,Tx})\le P_{CMAX}$, a UE transmits all $N_{sch,Tx}$ transmissions including RCI transmissions and PSFCH transmissions, then $N_{Tx}=N_{sch,Tx}$ and $P_k(i)=P_{one}$ When $P_{one}+10\log_{10}(N_{sch,Tx})>P_{CMAX}$ The UE autonomously selects $N_{Tx}$ transmissions with an ascending priority order such that $$N_{Tx}\ge\max\left(1,\ \sum_{i=1}^{K}M_i\right),$$

where $M_i$ is the number of RCIs and PSFCHs with priority value i, and K is the largest value satisfying $$P_{one}+10\log_{10}\left(\max\left(1,\ \sum_{i=1}^{K}M_i\right)\right)\le P_{CMAX}$$

if any, otherwise zero $P_k(i)=\min(P_{CMAX}-10\log_{10}(N_{Tx}),\ P_{one})$[dBm]

$N_{sch,Tx}>N_{max}$

The UE firstly selects $N_{max}$ transmissions including RCIs and PSFCHs with an ascending order.

When $P_{one}+10\log_{10}(N_{max})\le P_{CMAX}$ $N_{Tx}=N_{max}$ and $P_k(i)=P_{one}$ When $P_{one}+10\log_{10}(N_{max})>P_{CMAX}$ The UE autonomously selects $N_{Tx}$ transmissions with an ascending priority order such that $$N_{Tx}\ge\max\left(1,\ \sum_{i=1}^{K}M_i\right),$$

where $M_i$ is the number of RCIs and PSFCHs with priority value i, and K is the largest value satisfying $$P_{one}+10\log_{10}\left(\max\left(1,\ \sum_{i=1}^{K}M_i\right)\right)\le P_{CMAX}$$

if any, otherwise zero $P_k(i)=\min(P_{CMAX}-10\log_{10}(N_{Tx}),\ P_{one})$[dBm]

If $P_{o,PSFCH}$ is not provided:

The UE autonomously determines $N_{Tx}\ge 1$ transmissions, and $P_k(i)=P_{CMAX}-10\log_{10}(N_{Tx})$[dBm]. The UE only selects $N_{Tx}$ RCIs and PSFCHs with an ascending priority order.

Details described in the embodiments as illustrated and shown in FIGS. 1, 2, and 4-7, especially, contents relate to selecting a RCI transmission are applicable for the embodiments as illustrated and shown in FIG. 3. Moreover, details described in the embodiments of FIG. 3 are applicable for all the embodiments of FIGS. 1, 2, and 4-7.

Figure 4:
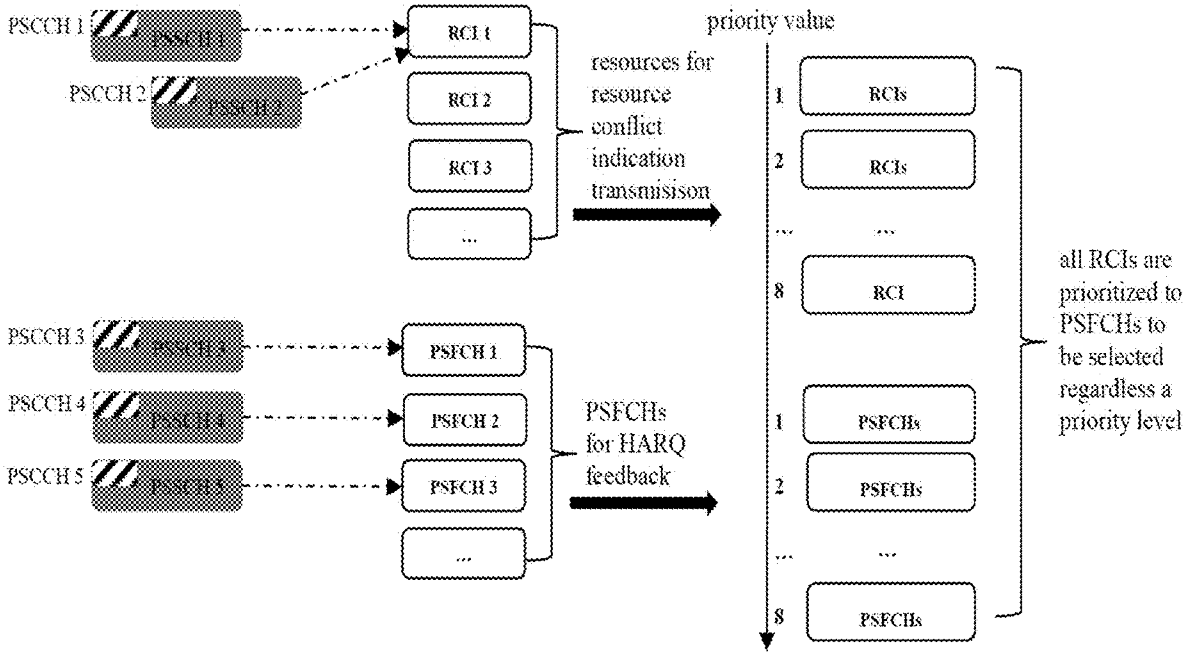
FIG. 4 illustrates an exemplary diagram for respectively ordering priorities of transmissions within two set of candidate transmissions according to some embodiments of the present application.

FIG. 4 illustrates an exemplary diagram for respectively ordering priorities of transmissions within two set of candidate transmissions according to some embodiments of the present application.

A RCI transmission is related to multiple UEs or multiple resources, and a PSFCH transmission for HARQ feedback is only related to one transmission or one UE. In a sense, the RCI transmission is much important than the PSFCH for HARQ feedback. In the embodiments of FIG. 4, all RCI transmissions are prioritized to all PSFCH transmissions regardless the associated priority values.

Similar to FIG. 3, in the embodiments of FIG. 4, $1^{st}$ set to be transmitted in a transmission occasion includes multiple RCI transmissions (i.e., RCI 1, RCI 2, RCI 3, and so on), and each RCI transmission may be associated with one or more priority values. $2^{nd}$ set to be transmitted in the transmission occasion includes multiple PSFCHs for HARQ feedback (i.e., PSFCH 1, PSFCH 2, PSFCH 3 and so on), and each PSFCH transmission for HARQ feedback is only associated with one priority value.

Different from FIG. 3, in the embodiments of FIG. 4, priorities of all transmissions within $1^{st}$ set and $2^{nd}$ set to be transmitted are respectively ordered, to form a set of prioritized transmissions. As shown in FIG. 4, all transmissions in $1^{st}$ set are respectively ordered as priority levels 1, 2, 3, 4, 5, 6, 7, and 8, and all transmissions in $2^{nd}$ set are respectively ordered as priority levels 1, 2, 3, 4, 5, 6, 7, and 8. All RCIs are prioritized to PSFCHs to be selected regardless a priority level. Specifically, a UE may firstly select transmission(s) from the set of prioritized RCI transmissions according to an ascending priority order; and if a power sum of all transmissions within the set of prioritized RCI transmissions is less than $P_{CMAX}$, the UE may secondly select transmission(s) from the set of prioritized PSFCH transmissions according to an ascending priority order.

According to some embodiments of FIG. 4, one priority threshold can be configured to control which priority levels are prioritized to PSFCHs. For instance, priority_threshold is configured. Only the RCIs with priority value(s)<=priority_threshold will be prioritized to other PSFCHs. RCIs with priority value(s)>priority_threshold will be treated as equivalent to PSFCHs, which is similar to contents in Embodiment 1.

The following texts describe specific Embodiment 2 of the method as shown and illustrated in FIG. 4. Contents in Embodiment 2 are similar to contents specified in 3GPP standard document TS38.213. According to Embodiment 2, a UE (e.g., UE 101*a* as shown and illustrated in FIG. 1) may select RCI transmission(s) and PSFCH transmission(s) by following steps and equations. $N_{sch,Tx,RCI}$ is a total number of RCI(s) associated with one or more reserved resources.

If $P_{o,PSFCH}$ is provided, $P_{one}=P_{o,PSFCH}+10\log_{10}(2^{\mu})+\alpha_{PSFCH}PL$[dBm]

$N_{sch,Tx}\le N_{max}$

When $P_{one}+10\log_{10}(N_{sch,Tx})\le P_{CMAX}$, the UE transmits all $N_{sch,Tx}$ transmissions including RCI transmissions and PSFCH transmissions, then $N_{Tx}=N_{sch,Tx}$ and $P_k(i)=P_{one}$ When $P_{one}+10\log_{10}(N_{sch,Tx})>P_{CMAX}$, $M_{RCI,i}$, the number of RCI transmissions with priority value i and $M_{PSFCH,i}$ the number of PSFCH transmissions with priority value i If $P_{one}+10\log_{10}(N_{sch,Tx,RCI})\le P_{CMAX}$ The UE autonomously selects $N_{Tx}$ transmissions including all $N_{sch,Tx,RCI}$ RCI transmissions and $N_{Tx}-N_{sch,Tx,RCI}$ PSFCH transmissions in ascending order of corresponding priority field values such that $$N_{Tx}\ge\max\left(1,\ N_{sch,Tx,RCI}+\sum_{i=1}^{K}M_{PSFCH,i}\right),$$

and K is the largest value satisfying $$P_{one}+10\log_{10}\left(\max\left(1,\ N_{sch,Tx,RCI}+\sum_{i=1}^{K}M_{PSFCH,i}\right)\right)\le P_{CMAX}$$

if any, otherwise zero $P_k(i)=\min(P_{CMAX}-10\log_{10}(N_{Tx}),\ P_{one})$[dBm]

If $P_{one}+10\log_{10}(N_{sch,Tx,RCI})>P_{CMAX}$

The UE autonomously selects $N_{Tx}$ RCI transmissions in ascending order of corresponding priority field values such that $$N_{Tx}\ge\max\left(1,\ \sum_{i=1}^{K}M_{RCI,i}\right),$$

and K is the largest value satisfying $$P_{one}+10\log_{10}\left(\max\left(1,\ \sum_{i=1}^{K}M_{RCI,i}\right)\right)\le P_{CMAX}$$

if any, otherwise zero $P_k(i)=\min(P_{CMAX}-10\log_{10}(N_{Tx}),\ P_{one})$[dBm]

$N_{sch,Tx}>N_{max}$

If $N_{sch,Tx,RCI}\ge N_{max}$, the UE firstly selects $N_{max}$ transmissions with an ascending order from all RCI transmissions If $N_{sch,Tx,RCI}<N_{max}$, the UE firstly selects all $N_{sch,Tx,RCI}$ transmissions and $N_{max}-N_{sch,Tx,RCI}$ with an ascending order from all PSFCH transmissions When $P_{one}+10\log_{10}(N_{max})\le P_{CMAX}$ $N_{Tx}=N_{max}$ and $P_k(i)=P_{one}$ When $P_{one}+10\log_{10}(N_{max})>P_{CMAX}$ If $P_{one}+10\log_{10}(N_{sch,Tx,RCI})\le P_{CMAX}$ The UE autonomously selects $N_{Tx}$ transmissions including all $N_{sch,Tx,RCI}$ RCI transmissions and $N_{Tx}-N_{sch,Tx,RCI}$ PSFCH transmissions in ascending order of corresponding priority field values such that $$N_{Tx}\ge\max\left(1,\ N_{sch,Tx,RCI}+\sum_{i=1}^{K}M_{PSFCH,i}\right),$$

and K is the largest value satisfying $$P_{one}+10\log_{10}\left(\max\left(1,\ N_{sch,Tx,RCI}+\sum_{i=1}^{K}M_{PSFCH,i}\right)\right)\le P_{CMAX}$$

if any, otherwise zero $P_k(i)=\min(P_{CMAX}-10\log_{10}(N_{Tx}),\ P_{one})$[dBm]

If $P_{one}+10\log_{10}(N_{sch,Tx,RCI})>P_{CMAX}$

The UE autonomously selects $N_{Tx}$ RCI transmissions in ascending order of corresponding priority field values such that $$N_{Tx}\ge\max\left(1,\ \sum_{i=1}^{K}M_{RCI,i}\right),$$

and K is the largest value satisfying $$P_{one}+10\log_{10}\left(\max\left(1,\ \sum_{i=1}^{K}M_{RCI,i}\right)\right)\le P_{CMAX}$$

if any, otherwise zero $P_k(i)=\min(P_{CMAX}-10\log_{10}(N_{Tx}),\ P_{one})$[dBm]

If $P_{o,PSFCH}$ is not provided

The UE autonomously determines $N_{Tx}\ge1$ transmissions, and $P_k(i)=P_{CMAX}-10\log_{10}(N_{Tx})$[dBm]. The UE only selects RCIs with an ascending priority order if $N_{Tx}\le N_{sch,Tx,RCI}$; if $N_{Tx}>N_{sch,Tx,RCI}$, the UE selects all RCIs and then selects $N_{Tx}-N_{sch,Tx,RCI}$ PSFCHs with an ascending priority order.

Details described in the embodiments as illustrated and shown in FIGS. 1-3 and 5-7, especially, contents relate to selecting a RCI transmission are applicable for the embodiments as illustrated and shown in FIG. 4. Moreover, details described in the embodiments of FIG. 4 are applicable for all the embodiments of FIGS. 1-3 and 5-7.

FIG. 5 illustrates an exemplary diagram for ranking priorities of different types of transmissions according to some embodiments of the present application.

In the embodiments of FIG. 5, a RCI transmission may be associated with one reserved resource or two reserved resources. If one RCI transmission is associated with two reserved resources, the one RCI transmission will be prioritized to other transmissions including RCI transmissions associated with 1 reserved resource and PSFCH transmissions for HARQ feedback.

As shown in FIG. 5, during ordering RCI(s) and PSFCH(s), RCI(s) associated with 2 reserved resources are prioritized to other transmission(s), i.e., RCI(s) associated with 1 reserved resource and PSFCH(s) for HARQ feedback. In the embodiments of FIG. 5, a UE firstly selects RCI(s) with 2 reserved resources with an ascending priority order; if there is remaining power for the UE, the UE selects RCI(s) associated with 1 reserved resource and PSFCH(s) with an ascending priority order.

The following texts describe specific Embodiment 3 of the method as shown and illustrated in FIG. 5. Contents in Embodiment 3 are similar to those in Embodiment 2. According to Embodiment 3, a UE (e.g., UE 101*a* as shown and illustrated in FIG. 1) may select RCI transmission(s) and PSFCH transmission(s) by following steps and equations. $N_{sch,Tx,RCI2}$ is a total number of RCI(s) associated with 2 reserved resources. $N_{sch,Tx,RCI1}$ is a total number of RCI(s) associated with 1 reserved resource.

If $P_{o,PSFCH}$ is provided, $P_{one}=P_{o,PSFCH}+10\log_{10}(2^{\mu})+\alpha_{PSFCH}PL$[dBm]

$N_{sch,Tx}\le N_{max}$: the UE adopt the same steps and equations as those of Embodiment 2.

$N_{sch,Tx}>N_{max}$

If $N_{sch,Tx,RCI}\ge N_{max}$, the UE firstly selects $N_{max}$ transmissions with an ascending order from all RCI transmissions If $N_{sch,Tx,RCI}<N_{max}$, the UE firstly selects all $N_{sch,Tx,RCI}$ transmissions and $N_{max}-N_{sch,Tx,RCI}$ with an ascending order from all PSFCH transmissions When $P_{one}+10\log_{10}(N_{max})\le P_{CMAX}$ $N_{Tx}=N_{max}$ and $P_k(i)=P_{one}$ When $P_{one}+10\log_{10}(N_{max})>P_{CMAX}$ If $P_{one}+10\log_{10}(N_{sch,Tx,RCI})\le P_{CMAX}$ The UE autonomously selects $N_{Tx}$ transmissions including all $N_{sch,Tx,RCI2}$ RCI transmissions associated with 2 reserved resources and $N_{Tx}-N_{sch,Tx,RCI2}$ transmissions including RCIs with 1 reserved resource and PSFCHs in ascending order of corresponding priority field values such that $$N_{Tx} \geq \max\left(1, N_{sch,Tx,RCI2} + \sum_{i=1}^{K} M_i\right),$$

and K is the largest value satisfying $$P_{one} + 10\log_{10}\left(\max\left(1, N_{sch,Tx,RCI2} + \sum_{i=1}^{K} M_i\right)\right) \leq P_{CMAX}$$

if any, otherwise zero; $M_i$ is the number of RCIs associated with 1 reserved resource and PSFCHs corresponding to priority i $P_k(i)=\min(P_{CMAX}-10\log_{10}(N_{Tx}), P_{one})$[dBm]

If $P_{one}+10\log_{10}(N_{sch,Tx,RCI2})>P_{CMAX}$

The UE autonomously selects $N_{Tx}$ RCI transmissions astocialed with 2 reserved resources in ascending order of corresponding priority field values such that $$N_{Tx} \geq \max\left(1, \sum_{i=1}^{K} M_i\right),$$

and K is the largest value satisfying $$P_{one} + 10\log_{10}\left(\max\left(1, \sum_{i=1}^{K} M_i\right)\right) \leq P_{CMAX}$$

if any, otherwise zero; $M_i$ is the number of RCIs associated with 2 reserved resources.

$P_k(i)=\min(P_{CMAX}-10\log_{10}(N_{Tx}), P_{one})$[dBm]

If $P_{o,PSFCH}$ is not provided

The UE autonomously determines $N_{Tx}\geq 1$ transmissions, and $P_k(i)=P_{CMAX}-10\log_{10}(N_{Tx})$[dBm]. The UE only selects RCIs associated with 2 reserved resources with an ascending priority order if $N_{Tx}\leq N_{sch,Tx,RCI22}$; if $N_{Tx}>N_{sch,Tx,RCI2}$, the UE selects all RCIs associated with 2 reserved resources and then selects $N_{Tx}-N_{sch,Tx,RCI2}$ PSFCHs and RCIs associated with 1 reserved resource with an ascending priority order.

Details described in the embodiments as illustrated and shown in FIGS. 1-4, 6, and 7, especially, contents relate to selecting a RCI transmission are applicable for the embodiments as illustrated and shown in FIG. 5. Moreover, details described in the embodiments of FIG. 5 are applicable for all the embodiments of FIGS. 1-4, 6, and 7.

FIG. 6 illustrates a further exemplary diagram for ranking priorities of different types of transmissions according to some embodiments of the present application.

In the embodiments of FIG. 6, a RCI transmission may be associated with one reserved resource or two reserved resources. RCI transmissions associated with 2 reserved resources are prioritized to RCI transmissions associated with 1 reserved resource, and RCI transmissions associated with 1 reserved resource are prioritized to PSFCHs.

As shown in FIG. 6, during ordering RCI(s) and PSFCH(s), RCI(s) associated with 2 reserved resources are prioritized to RCI(s) associated with 1 reserved resource, and RCI(s) associated with 1 reserved resource are prioritized to PSFCH(s) for HARQ feedback. In the embodiments of FIG. 6, a UE firstly selects RCI(s) with 2 reserved resources with an ascending priority order; if there is remaining power, the UE secondly selects RCI(s) associated with 1 reserved resource with an ascending priority order; if there is still remaining power, the UE finally selects PSFCH(s) with an ascending priority order.

The following texts describe specific Embodiment 4 of the method as shown and illustrated in FIG. 6. Contents in Embodiment 4 are similar to those in Embodiment 2. According to Embodiment 4, a UE (e.g., UE 101*a* as shown and illustrated in FIG. 1) may select RCI transmission(s) and PSFCH transmission(s) by following steps and equations. $N_{sch,Tx,RCI2}$ is a total number of RCI(s) associated with 2 reserved resources. $N_{sch,Tx,RCI1}$ is a total number of RCI(s) associated with 1 reserved resource.

If $P_{o,PSFCH}$ is provided, $P_{one}=P_{o,PSFCH}+10\log_{10}(2^{\mu})+\alpha_{PSFCH}PL$[dBm]

$N_{sch,Tx}\leq N_{max}$: the UE adopt the same steps and equations as those of Embodiment 2.

$N_{sch,Tx}>N_{max}$

If $N_{sch,Tx,RCI}\geq N_{max}$, the UE firstly selects $N_{max}$ transmissions with an ascending order from all RCI transmissions If $N_{sch,Tx,RCI}<N_{max}$, the UE firstly selects all $N_{sch,Tx,RCI}$ transmissions and $N_{max}-N_{sch,Tx,RCI}$ with an ascending order from all PSFCH transmissions When $P_{one}+10\log_{10}(N_{max})\leq P_{CMAX}$ $N_{Tx}=N_{max}$ and $P_k(i)=P_{one}$ When $P_{one}+10\log_{10}(N_{max})>P_{CMAX}$ If $P_{one}+10\log_{10}(N_{sch,Tx,RCI})\leq P_{CMAX}$ and $P_{one}+10\log_{10}(N_{sch,Tx,RCI2}+N_{sch,Tx,RCI1})>P_{CMAX}$ The UE autonomously selects $N_{Tx}$ transmissions including all $N_{sch,Tx,RCI2}$ RCI transmissions associated with 2 reserved resources and $N_{Tx}-N_{sch,Tx,RCI2}$ transmissions including RCIs with 1 reserved resource in ascending order of corresponding priority field values such that $$N_{Tx} \geq \max\left(1, N_{sch,Tx,RCI2} + \sum_{i=1}^{K} M_i\right)$$

and K is the largest value satisfying $$P_{one} + 10\log_{10}\left(\max\left(1, N_{sch,Tx,RCI2} + \sum_{i=1}^{K} M_i\right)\right) \leq P_{CMAX}$$

if any, otherwise zero; $M_i$ is the number of RCIs associated with 1 reserved resource corresponding to priority i $P_k(i)=\min(P_{CMAX}-10\log_{10}(N_{Tx}), P_{one})$[dBm]

If $P_{one}+10\log_{10}(N_{sch,Tx,RCI2}+N_{sch,Tx,RCI1})\leq P_{CMAX}$

The UE autonomously selects $N_{Tx}$ transmissions including all $N_{sch,Tx,RCI}$ RCI transmissions and $N_{Tx}-N_{sch,Tx,RCI}$ PSFCH transmissions in ascending order of corresponding priority field values such that $$N_{Tx} \geq \max\left(1, N_{sch,Tx,RCI} + \sum_{i=1}^{K} M_i\right)$$

and K is the largest value satisfying $$P_{one} + 10\log_{10}\left(\max\left(1, N_{sch,Tx,RCI} + \sum_{i=1}^{K} M_i\right)\right) \leq P_{CMAX}$$

if any, otherwise zero; $M_i$ is the number of PSFCHs corresponding to priority i $P_k(i)=\min(P_{CMAX}-10\log_{10}(N_{Tx}), P_{one})$[dBm]

If $P_{one}+10\log_{10}(N_{sch,Tx,RCI2})>P_{CMAX}$

The UE autonomously selects $N_{Tx}$ RCI transmissions associated with 2 reserved resources in ascending order of corresponding priority field values such that $$N_{Tx} \geq \max\left(1, \sum_{i=1}^{K} M_i\right)$$

and K is the largest value satisfying $$P_{one} + 10\log_{10}\left(\max\left(1, \sum_{i=1}^{K} M_i\right)\right) \leq P_{CMAX}$$

if any, otherwise zero; $M_i$ is the number of RCIs associated with 2 reserved resources $P_k(i)=\min(P_{CMAX}-10\log_{10}(N_{Tx}), P_{one})$[dBm]

If $P_{o,PSFCH}$ is not provided

The UE autonomously determines $N_{Tx}\geq 1$ transmissions, and $P_k(i)=P_{CMAX}-10\log_{10}(N_{Tx})$[dBm]. The UE only selects RCIs associated with 2 reserved resources with an ascending priority order if $N_{Tx}\leq N_{sch,Tx,RCI2}$, if $N_{sch,Tx,RCI2}+N_{sch,Tx,RCI1}\geq N_{Tx}>N_{sch,Tx,RCI2}$, the UE selects all RCIs associated with 2 reserved resources and then selects $N_{Tx}-N_{sch,Tx,RCI2}$ RCIs associated with 1 reserved resource with an ascending priority order, if $N_{Tx}>N_{sch,Tx,RCI2}+N_{sch,Tx,RCI1}$, the UE selects all RCIs and PSFCHs with an ascending priority order.

Details described in the embodiments as illustrated and shown in FIGS. 1-5 and 7, especially, contents relate to selecting a RCI transmission are applicable for the embodiments as illustrated and shown in FIG. 6. Moreover, details described in the embodiments of FIG. 6 are applicable for embodiments of FIGS. 1-5 and 7.

Figure 7:
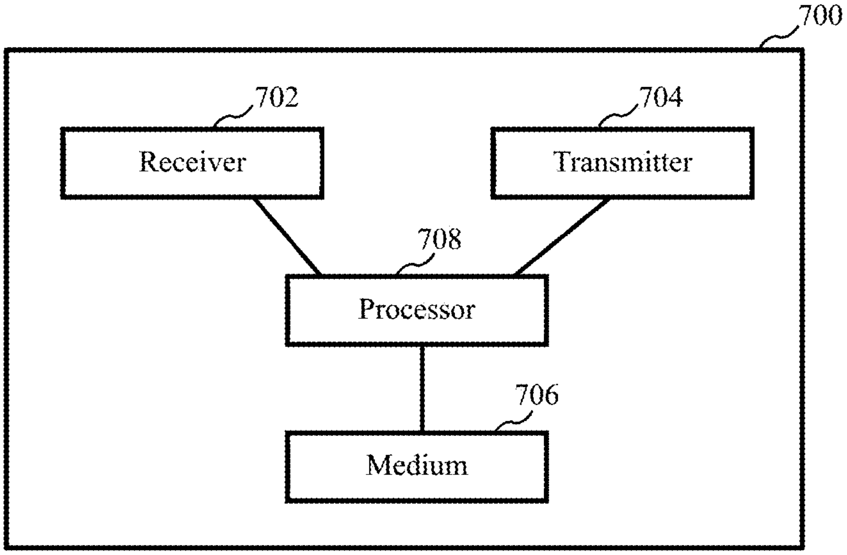
FIG. 7 illustrates an exemplary block diagram of an apparatus according to some embodiments of the present application.

FIG. 7 illustrates an exemplary block diagram of an apparatus according to some embodiments of the present application. In some embodiments of the present application, the apparatus 700 may be a UE, which can at least perform the method illustrated in any one of FIGS. 2-6.

As shown in FIG. 7, the apparatus 700 may include at least one receiver 702, at least one transmitter 704, at least one non-transitory computer-readable medium 706, and at least one processor 708 coupled to the at least one receiver 702, the at least one transmitter 704, and the at least one non-transitory computer-readable medium 706.

Although in FIG. 7, elements such as the at least one receiver 702, the at least one transmitter 704, the at least one non-transitory computer-readable medium 706, and the at least one processor 708 are described in the singular, the plural is contemplated unless limitation to the singular is explicitly stated. In some embodiments of the present application, the at least one receiver 702 and the at least one transmitter 704 are combined into a single device, such as a transceiver. In certain embodiments of the present application, the apparatus 700 may further include an input device, a memory, and/or other components.

In some embodiments of the present application, the at least one non-transitory computer-readable medium 706 may have stored thereon computer-executable instructions which are programmed to implement the operations of the methods, for example as described in view of any of FIGS. 2-6, with the at least one receiver 702, the at least one transmitter 704, and the at least one processor 708.

Those having ordinary skills in the art would understand that the operations of a method described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. Additionally, in some aspects, the operations of a method may reside as one or any combination or set of codes and/or instructions on a non-transitory computer-readable medium, which may be incorporated into a computer program product.

While this disclosure has been described with specific embodiments thereof, it is evident that many alternatives, modifications, and variations may be apparent to those skilled in the art. For example, various components of the embodiments may be interchanged, added, or substituted in the other embodiments. Also, all of the elements of each figure are not necessary ibr operation of the disclosed embodiments. For example, those having ordinary skills in the art would be enabled to make and use the teachings of the disclosure by simply employing the elements of the independent claims. Accordingly, embodiments of the disclosure as set forth herein are intended to be illustrative, not limiting. Various changes may be made without departing from the spirit and scope of the disclosure.

In this document, the terms "includes," "including," or any other variation thereof, are intended to cover a non-exclusive inclusion, such that a process, method, article, or apparatus that includes a list of elements does not include only those elements but may include other elements not expressly listed or inherent to such process, method, article, or apparatus. An element proceeded by "a," "an," or the like does not, without more constraints, preclude the existence of additional identical elements in the process, method, article, or apparatus that includes the element. Also, the term "another" is defined as at least a second or more. The term "having" and the like, as used herein, are defined as "including."

What is claimed:

1. A user equipment (UE), comprising:

a processor; and a memory coupled with the processor, wherein the processor is configured to cause the UE to:

determine that the UE is to transmit a first set of candidate transmissions to be transmitted on a transmission occasion in a time domain, wherein each transmission within the first set of candidate transmissions is used for a resource conflict indication;

determine that the UE is to transmit a second set of candidate transmissions to be transmitted on the transmission occasion, wherein each transmission within the second set of candidate transmissions is used for hybrid automatic repeat request (HARQ) feedback information;

select a subset of transmissions from at least one of the first set of candidate transmissions and the second set of candidate transmissions; and transmit the subset of transmissions on the transmission occasion.

2. The UE of claim 1, wherein each transmission within the first set of candidate transmissions is associated with one or more control signals, and wherein each of the one or more control signals includes a priority field value.

3. The UE of claim 2, wherein the processor is further configured to cause the UE to:

determine a smallest priority field value included in the one or more control signals associated with the each transmission within the first set of candidate transmissions; and use the smallest priority field value as a priority of the each transmission within the first set of candidate transmissions.

4. The UE of claim 1, wherein the processor is further configured to cause the UE to:

determine whether a power control parameter is configured to the UE.

5. The UE of claim 4, wherein the processor is further configured to cause the UE to:

in response to the power control parameter configured to the UE, compute a total number of all transmissions within the first set of candidate transmissions and the second set of candidate transmissions; and determine whether the total number is less than or equal to a maximum total number, wherein the maximum total number is associated with a capability of the UE.

6. The UE of claim 5, wherein the processor is further configured to cause the UE to:

in response to the total number less than or equal to the maximum total number, determine whether a power sum of all transmissions within the first set of candidate transmissions and the second set of candidate transmissions is less than or equal to a maximum power of the UE;

in response to the power sum less than or equal to the maximum power, transmit all transmissions within the first set of candidate transmissions and the second set of candidate transmissions on the transmission occasion; and in response to the power sum greater than the maximum power, ordering priorities of all transmissions within the first set of candidate transmissions and the second set of candidate transmissions, to form a set of prioritized transmissions, select the subset of transmissions from the set of prioritized transmissions according to an ascending priority order, wherein a power sum of the subset of transmissions is less than or equal to the maximum power, and wherein a total number of transmissions within the subset of transmissions is greater than or equal to a minimum threshold.

7. The UE of claim 6, wherein the UE is configured to select the subset of transmissions from the set of prioritized transmissions by:

computing a total number of transmissions associated with each priority in the set of prioritized transmissions with the ascending priority order;

computing a power sum of the transmissions associated with the each priority in the set of prioritized transmissions with the ascending priority order; and selecting all transmissions associated with one or more priorities from the set of prioritized transmissions, such that the one or more priorities are most priorities within priorities of all transmissions within the set of prioritized transmissions when a power sum of all transmissions associated with the one or more priorities is less than or equal to the maximum power.

8. The UE of claim 6, wherein the UE is configured to select the subset of transmissions from the set of prioritized transmissions by:

determining whether a power sum of all transmissions within the first set of candidate transmissions is greater than the maximum power;

in response to the power sum of all transmissions within the first set of candidate transmissions greater than the maximum power, selecting all transmissions associated with one or more priorities from the first set of candidate transmissions, such that the one or more priorities are most priorities within priorities of all transmissions within the first set of candidate transmissions when a power sum of all transmissions associated with the one or more priorities is less than or equal to the maximum power; and in response to the power sum of all transmissions within the first set of candidate transmissions less than or equal to the maximum power, selecting all transmissions within the first set of candidate transmissions and selecting one or more transmissions within the second set of candidate transmissions, such that a power sum of all selected transmissions is less than or equal to the maximum power.

9. The UE of claim 5, wherein the processor is further configured to cause the UE to:

in response to the total number greater than the maximum total number, order priorities of all transmissions within the first set of candidate transmissions and the second set of candidate transmissions, to form a set of prioritized transmissions; and select the subset of transmissions from the set of prioritized transmissions according to an ascending priority order, wherein selecting the subset of transmissions further comprises:

selecting the maximum total number of transmissions from the set of prioritized transmissions;

determining whether a power sum of the selected maximum total number of transmissions is less than or equal to a maximum power of the UE;

in response to the power sum less than or equal to the maximum power, transmitting the selected maximum total number of transmissions; and in response to the power sum greater than the maximum power, selecting one or more transmissions within the selected minimum number of transmissions according to the ascending priority order such that a power sum of the one or more transmissions is less than or equal to the maximum power, and transmitting the one or more transmissions on the transmission occasion.

10. The UE of claim 9, wherein the UE is configured to order the priorities by:

jointly ordering priorities of all transmissions within the first set of candidate transmissions and the second set of candidate transmissions, to form the set of prioritized transmissions; and selecting simultaneous transmissions from the set of prioritized transmissions according to the ascending priority order.

11. The UE of claim 9, wherein the UE is configured to order the priorities by:

ordering priorities of transmissions within the first set of candidate transmissions, to form a first set of prioritized transmissions; and ordering priorities of transmissions within the second set of candidate transmissions, to form a second set of prioritized transmissions, wherein the set of prioritized transmissions includes the first set of prioritized transmissions and the second set of prioritized transmissions.

12. The UE of claim 11, wherein the UE is further configured to select the maximum total number of transmissions from the set of prioritized transmissions according to the ascending priority order by:
in response to a total number of all transmissions within the first set of prioritized transmissions greater than or equal to the maximum total number, selecting the maximum total number of transmissions within the first set of prioritized transmissions according to the ascending priority order; and
in response to a total number of all transmissions within the first set of prioritized transmissions less than the maximum total number, further selecting one or more transmissions within the second set of prioritized transmissions according to the ascending priority order, such that a total number of all transmissions within the first set of prioritized transmissions and the one or more transmissions within the second set of prioritized transmissions is equal to the maximum total number.

13. The UE of claim 9, wherein the UE is further configured to select the one or more transmissions within the selected minimum number of transmissions according to the ascending priority order by:
computing a total number of transmissions associated with each priority in the selected minimum number of transmissions with the ascending priority order;
computing a power sum of the transmissions associated with the each priority in the selected minimum number of transmissions with the ascending priority order; and
selecting all transmissions associated with one or more priorities from the selected minimum number of transmissions, such that the one or more priorities are most priorities within the priorities of all transmissions within the selected minimum number of transmissions when a power sum of all transmissions associated with the one or more priorities is less than or equal to the maximum power.

14. The UE of claim 1, wherein each transmission within the subset of transmissions has a same transmitting power.

15. An apparatus for wireless communication, comprising:
at least one processor coupled with at least one memory and configured to cause the apparatus to:
determine that the processor is to transmit a first set of candidate transmissions to be transmitted on a transmission occasion in a time domain, wherein each transmission within the first set of candidate transmissions is used for a resource conflict indication;
determine that the processor is to transmit a second set of candidate transmissions to be transmitted on the transmission occasion, wherein each transmission within the second set of candidate transmissions is used for hybrid automatic repeat request (HARQ) feedback information;
select a subset of transmissions from at least one of the first set of candidate transmissions and the second set of candidate transmissions; and
transmit the subset of transmissions on the transmission occasion.

16. The apparatus of claim 15, wherein each transmission within the first set of candidate transmissions is associated with one or more control signals, and wherein each of the one or more control signals includes a priority field value.

17. The apparatus of claim 16, wherein the apparatus is further configured to:
determine a smallest priority field value included in the one or more control signals associated with the each transmission within the first set of candidate transmissions; and
use the smallest priority field value as a priority of the each transmission within the first set of candidate transmissions.

18. The apparatus of claim 15, wherein each transmission within the subset of transmissions has a same transmitting power.

19. A method performed by a user equipment (UE), the method comprising:
determining that the UE is to transmit a first set of candidate transmissions to be transmitted on a transmission occasion in a time domain, wherein each transmission within the first set of candidate transmissions is used for a resource conflict indication;
determining that the UE is to transmit a second set of candidate transmissions to be transmitted on the transmission occasion, wherein each transmission within the second set of candidate transmissions is used for hybrid automatic repeat request (HARQ) feedback information;
selecting a subset of transmissions from at least one of the first set of candidate transmissions and the second set of candidate transmissions; and
transmitting the subset of transmissions on the transmission occasion.

20. The method of claim 19, wherein each transmission within the subset of transmissions has a same transmitting power.

* * * * *